Dec. 8, 1959  B. ONOFRI  2,916,597
RESISTANCE SUPPORTING PLATE, AND
PROCESS FOR ITS MANUFACTURE
Filed Oct. 16, 1957  2 Sheets-Sheet 1
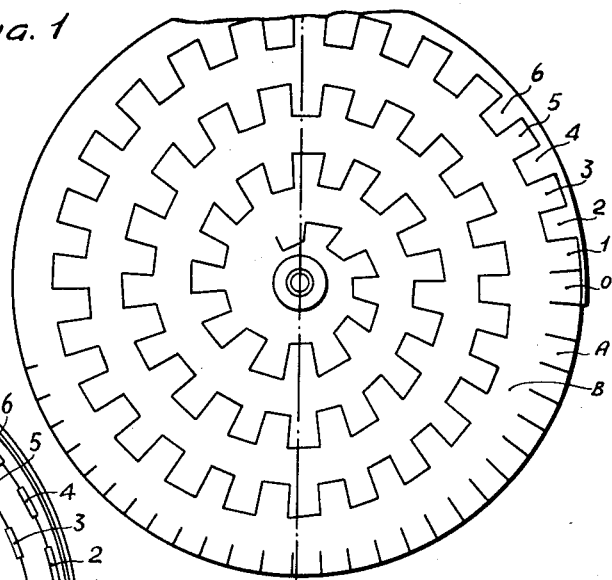
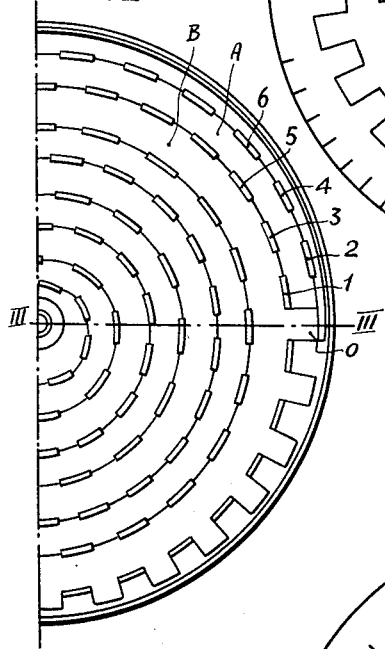
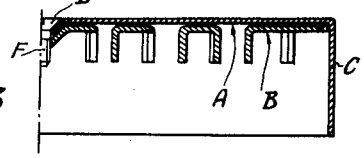
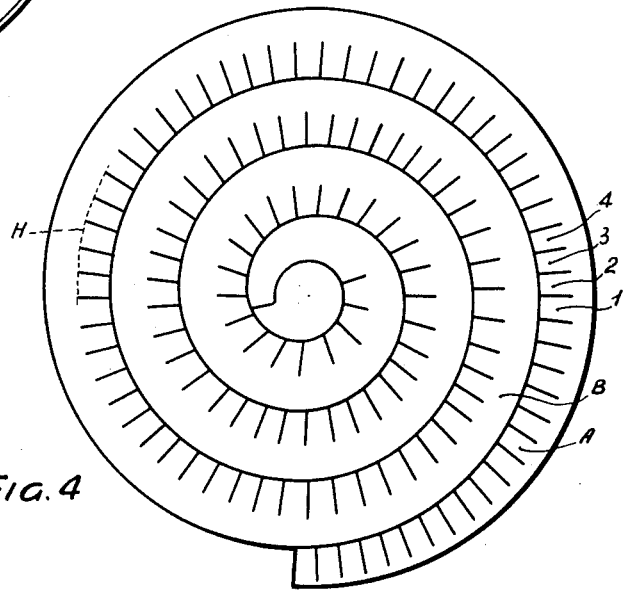

Dec. 8, 1959  B. ONOFRI  2,916,597
RESISTANCE SUPPORTING PLATE, AND
PROCESS FOR ITS MANUFACTURE
Filed Oct. 16, 1957  2 Sheets-Sheet 2
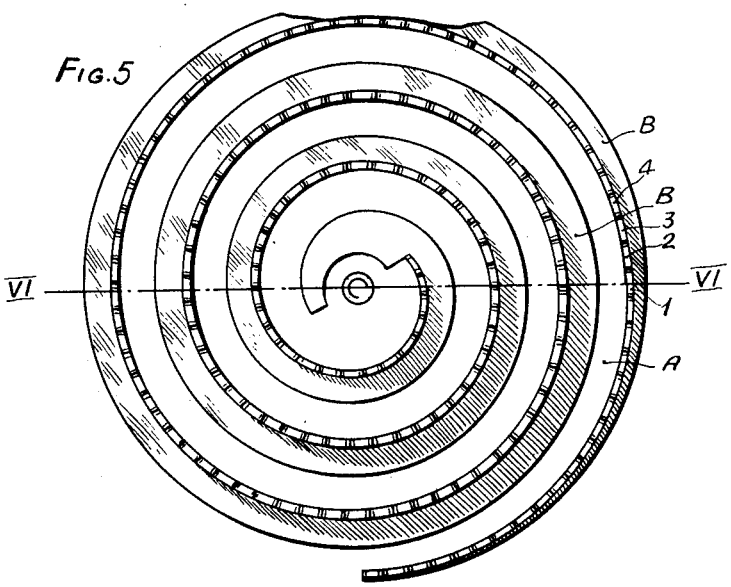
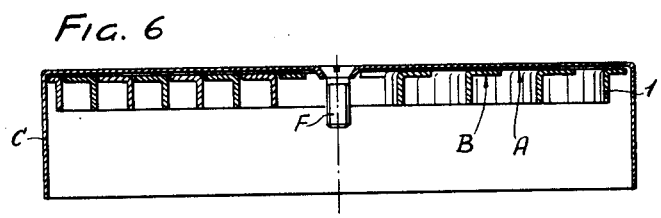
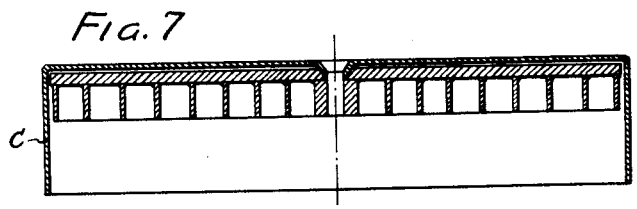
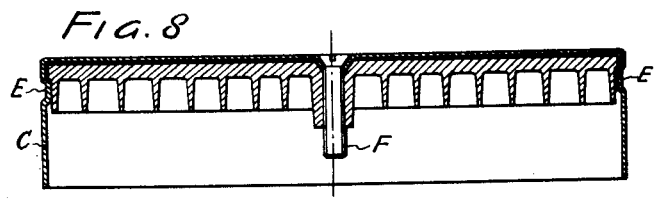

United States Patent Office 2,916,597
Patented Dec. 8, 1959

2,916,597

RESISTANCE SUPPORTING PLATE, AND PROCESS FOR ITS MANUFACTURE

Bruno Onofri, Renate Brianza, Italy

Application October 16, 1957, Serial No. 690,505

Claims priority, application Italy January 10, 1957

7 Claims. (Cl. 219—37)

The present invention relates to a new improved hot plate in a single plane for electric kitchens and to the process for its manufacture.

The hot plates for electric kitchens known up to now consisted of a single body of cast-iron and were internally provided with a spiral in which the resistance was placed. These cast-iron plates were easily oxidable and had the further drawback of being heavy and slow to be heated.

The object of the present invention is a hot plate consisting of a low container in a stainless sheet steel comprising a bottom and a peripherical wall, on said bottom being applied and fixed a disc presenting an helicoidal channel or spiral, which is suited to receive the electric resistance.

The fastening of the disc provided with the helicoidal channel to the stainless steel container may be realized by means of a central stud or welding points or by means of a seat suited to receive said stud.

A first embodiment according to the invention may be obtained by manufacturing the resistance supporting spiral by means of a stainless steel disc in which staggered teeth are helicoidally carved, said teeth being alternatively turned to one side and to the another, and hence bent upwards so as to constitute a helicoidal channel with alternated and discontinuous wall.

Obviously the so obtained resistance supporting channel even if provided with partly open and discontinuous walls, may be used as guide and support for the resistance.

A second modified embodiment in which the resistance supporting channel is formed by adjacent teeth will be obtained by tracing on two discs of the same diameter respectively two spiral surfaces and carving on them many teeth which will all be turned toward the same side. The size of one of the surfaces will be such as to fit in the space left free by the raised teeth belonging to the spiral surface traced on the other disc. In this manner the raised teeth of one disc will form a wall of the channel while the others belonging to the second disc will form the second wall.

A third embodiment may be realized by welding or connecting in a different manner a cast-iron or warm stamped steel disc provided with a resistance supporting channel to the bottom of the stainless steel plate, whereby said disc with its relative spiral channel may be obtained by welding on a base disc a spiral formed by an helicoidally winding tape or band placed normally to the base disc.

Some embodiments of the present invention will be described now in details by referring to the accompanying drawings in which:

Fig. 1 shows a plane view of a disc with carved teeth which will be used to obtain a spiral channel according to the first inventive idea;

Fig. 2 is a partial view of the disc of Fig. 1 mounted on a hot plate and with carved teeth bent normally to the plane of the disc;

Fig. 3 shows a diametral section taken along the line III—III of Fig. 2;

Fig. 4 shows a plane view of a disc with carved teeth suited to obtain a side or wall of the spiral channel according to the second inventive idea;

Fig. 5 is a plane view of the disc of Fig. 4, the teeth of which are bent normally to the plane of the disc;

Fig. 6 shows a diametral section taken along the line VI—VI of the disc shown in Fig. 5 mounted on a hot plate, on the left side a similar disc being shown which forms with its raised teeth the second wall of the spiral channel.

Fig. 7 shows a cast-iron plate mounted on a stainless steel box obtained by welding of a band; and Fig. 8 shows a cast-iron plate mounted on a stainless steel-box obtained by casting.

The process to obtain a helicoidal spiral channel according to the first inventive idea is as follows: on the disc shown in Fig. 1 are traced two helicoidal surfaces A and B. On the helicoidal surface A adjacent teeth are carved in which are radially directed and alternatively turned toward the outside and the inside.

If we agree to indicate the teeth with the series of increasing numbers, that is with 1, 2, 3, 4 and so on, starting from the tooth 0 at the extreme right and proceeding in clockwise or counter-clock-wise direction the odd teeth will be turned toward the outside while the one indicated with 0 and the even ones will be turned toward the inside.

Obviously said agreement will only serve to make the inventive idea more understandable. The helicoidal surface B is on the contrary kept entire that is it does not have any carved teeth.

The teeth are then bent about their connecting line with the helicoidal surface B so that they place themselves normally to the plane of the disc forming so the lateral discontinuous wall of a channel, the bottom of which is constituted by the helicoidal surface B, as it is clearly shown in Fig. 2. By the above stated agreement we may now observe that the odd teeth constitute the external wall of the channel while the even ones constitute the internal wall of the same, the bottom of which is the helicoidal surface B.

The disc provided with the so obtained helicoidal channel is finally mounted on a stainless steel box-like hot plate by means of a central stud. The fastening of the disc to the box could be realized either by welding points or by any other suitable system.

The process to obtain a helicoidal spiral according to the second inventive idea is as follows: Two helicoidal surfaces A and B are traced on the disc shown in Fig. 4. On the helicoidal surface A are carved adjoining radial teeth 1, 2, 3, 4 and so on, which are all turned toward the inside, while the helicoidal surface B is left entire.

Then all the teeth are bent about their connecting line with the helicoidal surface B, so that the teeth place themselves normally to the plane of the disc forming so the lateral almost continuous left wall of the helicoidal surface B, is as it is clearly shown in Fig. 5.

The so formed disc is going to be fixed to the stainless steel hot plate C in the already mentioned manner as it is clearly shown on the right side of Fig. 6.

If a disc similar to the one shown in Fig. 5 upon being rotated is going to be mounted, the helicoidal surface B of this second disc places itself correspondingly to the surface A of the first one, giving rise to the configuration shown in the left side of Fig. 6.

In a third embodiment according to the invention a cast-iron disc provided with a channel with continuous walls obtained either by casting (Fig. 8) or by welding of a band (Fig. 7) is applied by means of welding or (Fig. 8) a rim E and a central stud F to the bottom of any suitable stainless steel plate C.

These embodiments are particularly advantageous because the stainless steel plate 6 which comes into contact with the air and with possible acids cannot be oxidized and furthermore it is lighter than the corresponding cast-iron plates, while the cast-iron disc, to which the channel is fastened, will consent a good heat transfer.

What I claim is:

1. A supporting structure for an electrical resistance device comprising a plate member, a peripheral wall member depending from said plate and defining a chamber therewith, and means connected to one of the members in said chamber and defining a channel adapted to accommodate the electrical resistance device; said means comprising a sheet having the shape of a spiral and a plurality of perpendicular wall sections integral with said sheet and disposed along the spiral thus defining said channel.

2. A structure as claimed in claim 1, wherein the sheet is a disc of stainless steel.

3. A structure as claimed in claim 1, wherein the vertical wall sections have the configuration of teeth.

4. A structure as claimed in claim 3, wherein said means comprises two slit sheets with contiguous teeth forming the walls of the channel.

5. A process for making a supporting structure for an electrical resistance device comprising the step of slitting a sheet to form a plurality of teeth disposed on a spiral, bending the teeth substantially normal to the sheet to provide a wall defining a spiral channel, and fastening the sheet complete with its spiral channel on a support.

6. A process as claimed in claim 5, wherein the teeth are slit on opposite sides of a spiral surface in staggered relation.

7. A process for making a supporting structure for an electrical resistance device comprising slitting on two sheets a plurality of contiguous teeth on one side of a spiral surface, bending the teeth substantially normal to the associated sheet to provide a wall for a spiral channel and at the same time a spiral slot at the base of the sheet, inserting one sheet within the spiral slot of the other sheet so that said sheets are superposed and fastening said two superposed sheets with the spiral channel to a support.

References Cited in the file of this patent

UNITED STATES PATENTS

| | | |
|---|---|---|
| 1,808,267 | Steinour | June 2, 1931 |
| 2,290,901 | Weinhardt et al. | July 28, 1942 |
| 2,728,982 | Merrill | Jan. 3, 1956 |

FOREIGN PATENTS

| | | |
|---|---|---|
| 431,232 | Great Britain | July 3, 1935 |
| 516,364 | Great Britain | Jan. 1, 1940 |
| 593,635 | Great Britain | Oct. 22, 1947 |